United States Patent [19]

Ito et al.

[11] 4,214,568

[45] Jul. 29, 1980

[54] DRIVE UNIT FOR A DISTRIBUTOR AND A FUEL PUMP

[75] Inventors: Eiji Ito, Nagoya; Shigeki Okaguchi, Toyota, both of Japan

[73] Assignee: Toyota Jidosha Kogyo Kabushiki Kaisha, Toyota, Japan

[21] Appl. No.: 946,160

[22] Filed: Sep. 27, 1978

[30] Foreign Application Priority Data

May 26, 1978 [JP] Japan ............................. 53-62285

[51] Int. Cl.² ...................... F02B 77/00; F16H 53/00
[52] U.S. Cl. .................................. 123/198 R; 74/567
[58] Field of Search .................. 74/567; 123/90, 31, 123/198 R, 1 R; 29/149.5 S, 159.2, 525

[56] References Cited

U.S. PATENT DOCUMENTS

| | | | |
|---|---|---|---|
| 2,489,444 | 11/1949 | Bechler | 74/567 |
| 2,607,196 | 8/1952 | May | 74/567 |
| 3,144,009 | 8/1964 | Goodfellow et al. | 74/567 |
| 3,178,954 | 4/1965 | Whiting | 74/567 |
| 3,204,482 | 9/1965 | Behnke | 74/567 |
| 3,740,829 | 6/1973 | Yarger | 74/567 |
| 4,076,437 | 2/1978 | Mazzolla | 74/567 |
| 4,094,201 | 6/1978 | Eheim | 74/567 |

*Primary Examiner*—Ira S. Lazarus
*Attorney, Agent, or Firm*—Kenyon & Kenyon

[57] ABSTRACT

A drive unit for driving both a distributor and a fuel pump, in which a driving gear which is in meshed engagement with a driven gear on a rotating shaft of a distributor is fixed on a drive shaft and formed integrally with a cam which engages an operating lever of a mechanical fuel pump, and a collar is force or press fitted on said cam.

4 Claims, 4 Drawing Figures

DRIVE UNIT FOR A DISTRIBUTOR AND A FUEL PUMP

BACKGROUND OF THE INVENTION

1. Field of the Invention.

This invention relates to an apparatus for driving a distributor and a fuel pump of a spark ignition internal combustion engine.

2. Description of the Prior Art.

The distributor of a conventional spark ignition internal combustion engine is driven by a driving gear on a cam shaft of the engine, which meshes with a driven gear provided on a rotating distributor shaft. The mechanical fuel pump, which is usually a diaphragm pump, is also driven by the cam shaft, but through an operating lever which engages a drive cam on the cam shaft.

In a typical design, the distributor drive gear and the fuel pump drive cam are axially juxtaposed and are made as a single integral unit of annular shape which is fixed to the cam shaft. Direct high frequency hardening and annealing treatments of the drive cam for reducing its frictional wear invariably give rise to drawbacks such as internal distortion of the cam, which necessitates a further grinding operation to correct the inner bore of the unit, and the creation of scale on the outer peripheral surface of the cam, which has to be removed by barrel grinding. In addition, if the high frequency hardening and annealing process is not uniform over the entire cam surface which engages the pump lever, uneven wear of the lever and the cam could result. On the other hand, should part of the distributor drive gear be affected by the high frequency hardening and annealing, that part of the gear would be hardened and thus shorten the service life of the gear hobbing machine.

SUMMARY OF THE INVENTION

The present invention has as its object the elimination of the above-mentioned drawbacks.

According to the instant invention, an integral distributor drive gear and fuel pump drive cam unit are formed of mild steel or other easily machined material and then a heat treated annular collar is force fitted or press fitted on the fuel pump cam to provide a hardened wearing surface for the cam.

DESCRIPTION OF THE PREFERRED EMBODIMENT

Figure 1:
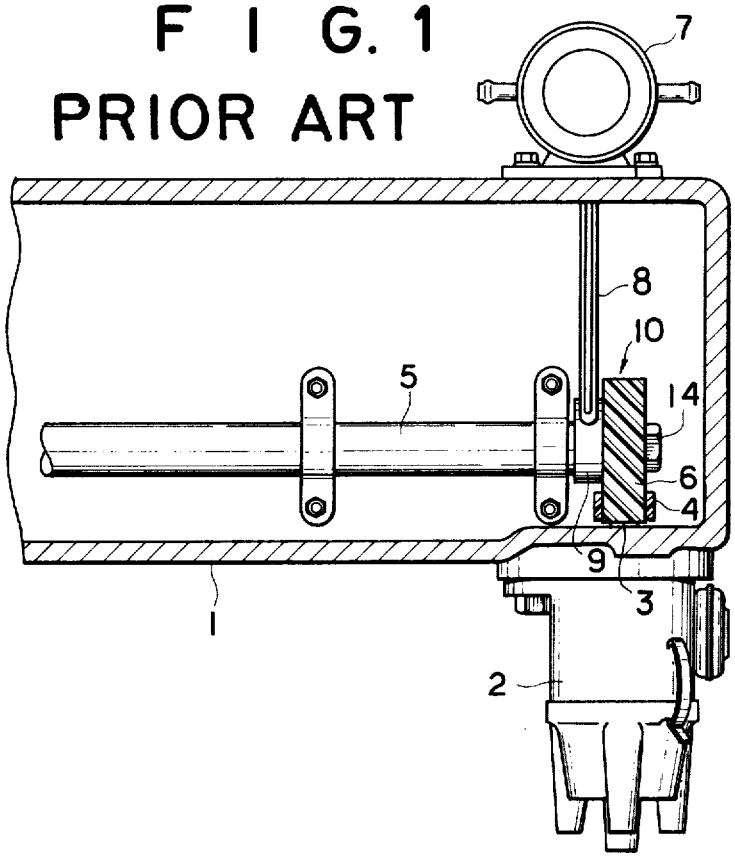
FIG. 1 is a partial schematic plan view of a spark ignition internal combustion engine showing a conventional arrangement for driving the distributor and fuel pump.
Figure 2:
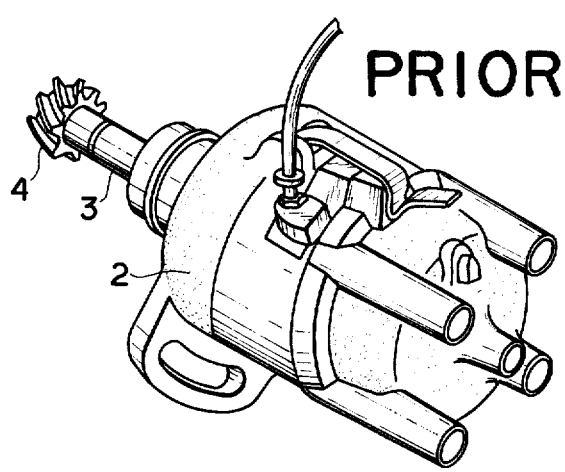
FIG. 2 is a perspective view of the distributor of FIG. 1 showing the distributor shaft and driven gear.

Referring to FIGS. 1 and 2, a distributor 2 of a known type is mounted on a cylinder head 1 of a conventional spark ignition internal combustion engine. The distributor has a rotating shaft 3 carrying a driven gear 4 which is driven by a cam shaft 5, extending within the cylinder head 1, through meshed engagement with a drive gear 6 on the cam shaft 5. A fuel pump 7 of a known type is also mounted on the cylinder head 1 and has an operating lever 8 biased into sliding engagement with a drive cam 9 which is fixed onto the cam shaft 5. The pump lever 8 is thus driven similarly by the cam shaft 5. The externally toothed distributor drive gear 6 is formed integrally with the fuel pump drive cam 9 in axially juxtaposed relation therewith to form an integral annular unit 10.

Figure 3:
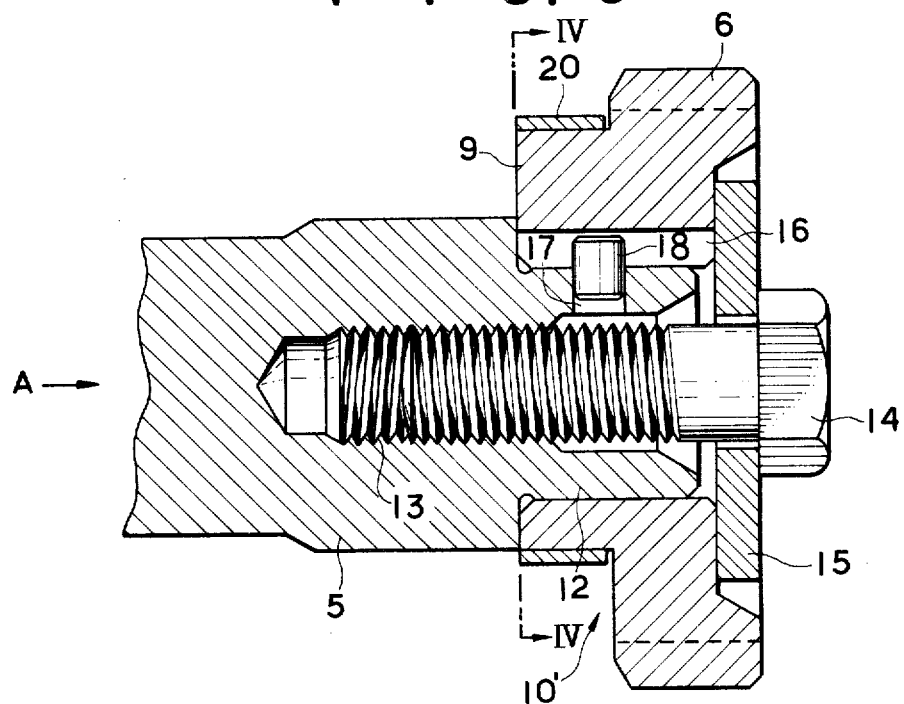
FIGS. 3 and 4 are an axial cross section and an end view, respectively, of the main component parts of the device for driving the distributor and fuel pump according to the present invention.
Figure 4:
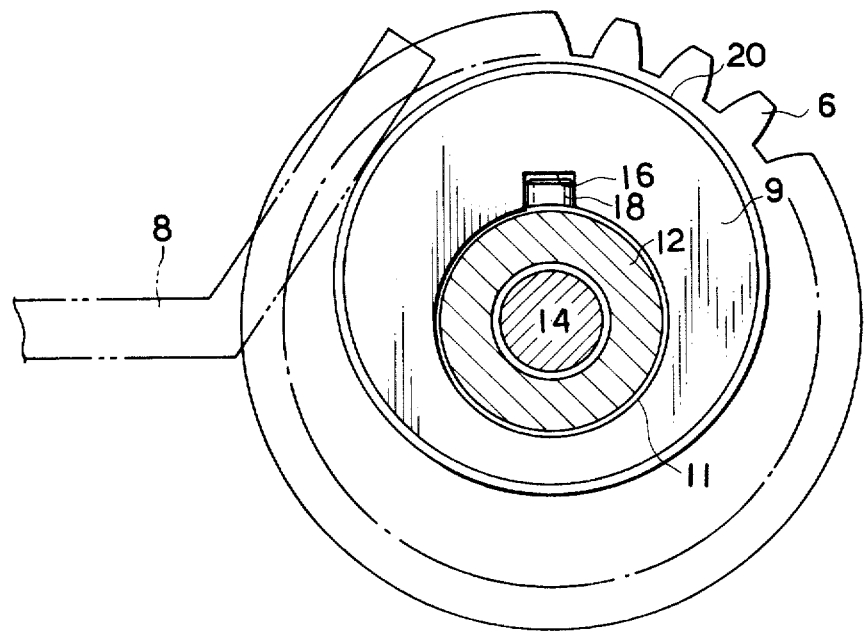

As described above, the integral distributor drive gear and fuel pump drive cam unit 10 of the prior art is selectively heat treated to provide a wear resistant cam surface. With reference next to FIGS. 3 and 4, the similar annular unit 10' of the present invention has an inner bore 11 fitted on a reduced diameter portion 12 at the end of the cam shaft 5 and is axially secured to the cam shaft 5 by a bolt 14 which is threaded into a tapped center hole 13 of the cam shaft 5 and bears against the end face of the annular unit 10' through a washer 15.

To determine the angular position of the annular unit 10' and to block its rotation relative to the cam shaft 5, an axial groove 16 is formed in the inner periphery 11 of the annular unit 10', the axial groove 16 receiving a pin 18 which is inserted in a radial hole 17 in the reduced diameter portion 12 of the cam shaft.

The annular unit 10' of the present invention comprises an integral cam 9 and gear 6 made of mild steel or other machineable non-heat treated material which permits all machining operations, including finishing the bore, machining the cam surface, and shaping the gear teeth on a hobbing machine, to be accomplished easily. The cam surface on this unit is machined a predetermined amount undersize, and then a separately heat-treated annular collar 20 having an internal circumference smaller than the circumference of said cam surface to provide a predetermined interference fit is assembled, as by force fitting or press fitting, onto the drive cam 9. As is clearly apparent from FIG. 4, the cam surface of this embodiment is circular, thereby simplifying the machining of the cam and the fabrication and assembly of the collar thereon.

According to the present invention, therefore, the collar 20 alone is subjected to the necessary heat treatment, prior to its assembly as part of the annular unit 10', so that there is no necessity for the selective heat treatment of the circumferential surface of the cam 9. Avoiding the need for heat treatment completely precludes distortion of the inner bore 11 of the annular unit 10' due to such thermal treatment and the creation of scale on the drive cam surface. This means that grinding operations for truing the inner bore 11 and for removing scale become unnecessary. In addition, there is no necessity for facilities for the high frequency hardening and annealing of the cam 9. The gear 6 is completely free from the influence of the thermal treatment of the cam 9 and therefore has no possibility of unduly shortening the life of the gear hobbing machine. Moreover, the collar 20 allows easy press fitting and thus contributes to reduced production cost of the unit.

We claim:

1. A drive unit for a distributor and a fuel pump of a spark ignition internal combustion engine, the unit including a drive gear integrally formed with an axially adjacent drive cam, the integral gear and cam unit being adapted to be mounted on a camshaft of the engine with the drive gear in meshing engagement with a driven gear on a distributor drive shaft and with the cam in sliding engagement with a fuel pump actuating lever, wherein the improvement comprises:

said integral drive gear and cam unit being formed of easily machineable non-heat treated material, and said unit further comprising a fully heat treated collar interference fitted onto the drive cam to provide a wear resistant surface for said cam.

2. A drive unit according to claim 1 wherein the cam surface is circular.

3. A drive unit according to claim 1 wherein the collar is force fitted or press fitted onto the drive cam.

4. A drive unit according to claim 1 including means for securing the drive unit to a drive shaft by a threaded bolt.

* * * * *